United States Patent
Huang et al.

(10) Patent No.: US 10,045,286 B2
(45) Date of Patent: Aug. 7, 2018

(54) METHOD AND APPARATUS FOR SELECTING NETWORK

(71) Applicant: Xiaomi Inc., Beijing (CN)

(72) Inventors: Jiangtao Huang, Beijing (CN); Qiang Wang, Beijing (CN); Long Sun, Beijing (CN)

(73) Assignee: Xiaomi Inc., Beijing (CN)

( * ) Notice: Subject to any disclaimer, the term of this patent is extended or adjusted under 35 U.S.C. 154(b) by 0 days.

(21) Appl. No.: 15/355,687

(22) Filed: Nov. 18, 2016

(65) Prior Publication Data

US 2017/0150434 A1 May 25, 2017

(30) Foreign Application Priority Data

Nov. 20, 2015 (CN) .......................... 2015 1 0813224

(51) Int. Cl.
*H04W 36/00* (2009.01)
*H04W 48/18* (2009.01)
(Continued)

(52) U.S. Cl.
CPC ....... *H04W 48/18* (2013.01); *H04W 36/0072* (2013.01); *H04W 36/0083* (2013.01);
(Continued)

(58) Field of Classification Search
CPC ............. H04W 36/14; H04W 36/0072; H04W 36/0083; H04W 36/0088; H04W 48/16; H04W 48/18
See application file for complete search history.

(56) References Cited

U.S. PATENT DOCUMENTS

2008/0176565 A1  7/2008  Eerolainen et al.
2014/0113633 A1* 4/2014  Lee ..................... H04W 36/08
                                                          455/436
(Continued)

FOREIGN PATENT DOCUMENTS

CN       1889775 A     1/2007
CN     102752826 A    10/2012
(Continued)

OTHER PUBLICATIONS

International Search Report in International Application No. PCT/CN2016/100318, dated Jan. 3, 2017.
(Continued)

*Primary Examiner* — Wayne H Cai
(74) *Attorney, Agent, or Firm* — Finnegan, Henderson, Farabow, Garrett & Dunner LLP (57) ABSTRACT

A method for a mobile terminal to select a network includes: when the mobile terminal is unable to reside on a top-priority network, recording information of a first cell of the top-priority network that the mobile terminal is unable to reside on, wherein the top-priority network is determined based on a rule preset in the mobile terminal; monitoring an environment for detecting the top-priority network when the mobile terminal is residing on a non-top-priority network; and if a second cell of the top-priority network is detected and a relationship between the detected second cell and the first cell satisfies a preset condition, handing over the mobile terminal to the detected second cell, no matter whether a current network connection state of the mobile terminal is an idle state.

9 Claims, 6 Drawing Sheets

(51) Int. Cl.
    *H04W 48/16*    (2009.01)
    *H04W 36/14*    (2009.01)

(52) U.S. Cl.
    CPC ........ *H04W 36/0088* (2013.01); *H04W 36/14* (2013.01); *H04W 48/16* (2013.01)

(56) References Cited

U.S. PATENT DOCUMENTS

| | | | |
|---|---|---|---|
| 2015/0289189 A1* | 10/2015 | Yang | H04W 36/30 455/437 |
| 2016/0050590 A1* | 2/2016 | Ponukumati | H04B 17/309 455/437 |

FOREIGN PATENT DOCUMENTS

| | | | |
|---|---|---|---|
| CN | 103582061 A | 2/2014 | |
| CN | 104025655 A | 9/2014 | |
| EP | 2 249 608 A1 | 11/2010 | |
| JP | 2012526407 A | 10/2012 | |
| RU | 2487495 C2 | 7/2013 | |
| WO | WO 2009/004405 A1 | 1/2009 | |
| WO | WO 2014/101349 A1 | 7/2014 | |
| WO | WO 2014/182209 A1 | 11/2014 | |

OTHER PUBLICATIONS

Extended Search Report for European Application No. 16199513.9 from the European Patent Office, dated Apr. 4, 2017.
English version of International Search Report of PCT Application No. PCT/CN2016/100318, dated Jan. 3, 2017, issued by the ISA/CN—State Intellectual Property Office of the P.R. China.
Office Action in counterpart Russian Application No. 2016148642/07(078134), dated Dec. 7, 2017.

\* cited by examiner

METHOD AND APPARATUS FOR SELECTING NETWORK

CROSS-REFERENCE TO RELATED APPLICATIONS

The present application is based upon and claims priority to Chinese Patent Application 201510813224.9, filed on Nov. 20, 2015, the entire contents of which are incorporated herein by reference.

TECHNICAL FIELD

The present disclosure generally relates to the field of communication technology, and more particularly, to a method and an apparatus for selecting a network.

BACKGROUND

Generally, mobile terminals supporting multi-modes may operate on networks with different modes, such as 4G, 3G, 2G or the like. For example, due to reasons such as congestion or weak signals, a mobile phone may fall from a top-priority network, such as a Long Term Evolution (LTE) network, to a low-priority network, such as a 3G or 2G network. In the related art, for example, in a 3GPP (3rd Generation Partnership Project) standard, it is stipulated that if a network having higher priority than a current network is detected, the mobile terminal needs to return to the network with higher priority. However, in some cases, the network itself may not provide an instruction, such as an identifier indicating its priority level. At this time, when the mobile terminal resides on a network with substantially lower priority while a higher priority network of a good condition is available, a re-selection condition may not be satisfied. That is, even if there is a network with substantially higher priority available, the mobile terminal may not quickly return to the network with substantially higher priority.

SUMMARY

According to a first aspect of the present disclosure, there is provided a method for a mobile terminal to select a network. The method includes: when the mobile terminal is unable to reside on a top-priority network, recording information of a first cell of the top-priority network that the mobile terminal is unable to reside on, wherein the top-priority network is determined based on a rule preset in the mobile terminal; monitoring an environment for detecting the top-priority network when the mobile terminal is residing on a non-top-priority network; and if a second cell of the top-priority network is detected and a relationship between the detected second cell and the first cell satisfies a preset condition, handing over the mobile terminal to the detected second cell, no matter whether a current network connection state of the mobile terminal is an idle state.

According to another aspect of the present disclosure, there is provided a mobile terminal for selecting a network. The mobile terminal includes a processor and a memory for storing instructions executable by the processor. The processor is configured to perform: when the mobile terminal is unable to reside on a top-priority network, recording information of a first cell of the top-priority network, wherein the top-priority network is determined based on a rule preset in the mobile terminal; monitoring an environment for detecting the top-priority network when the mobile terminal is residing on a non-top-priority network; and if a second cell of the top-priority network is detected and a relationship between the detected second cell and the first cell satisfies a preset condition, handing over the mobile terminal to the detected second cell, no matter whether a network connection state of the mobile terminal is an idle state.

According to another aspect of the present disclosure, there is provided a non-transitory computer readable storage medium storing instructions that, when executed by a processor in a mobile terminal, cause the mobile terminal to perform a method for selecting a network, the method including: when the mobile terminal is unable to reside on a top-priority network, recording information of a first cell of the top-priority network, wherein the top-priority network is determined based on a rule preset in the mobile terminal; monitoring an environment for detecting the top-priority network when the mobile terminal is residing on a non-top-priority network; and if a second cell of the top-priority network is detected and a relationship between the detected second cell and the first cell satisfies a preset condition, handing over the mobile terminal to the detected second cell, no matter whether a network connection state of the mobile terminal is an idle state.

It is to be understood that both the foregoing general description and the following detailed description are exemplary and explanatory only and are not restrictive of the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

A mobile terminal herein may be a mobile phone, a tablet PC, an e-book reader, a MP3 (Moving Picture Experts Group Audio Layer III) player, a MP4 (Moving Picture Experts Group Audio Layer IV) player, a portable laptop computer, or the like.

Figure 1:
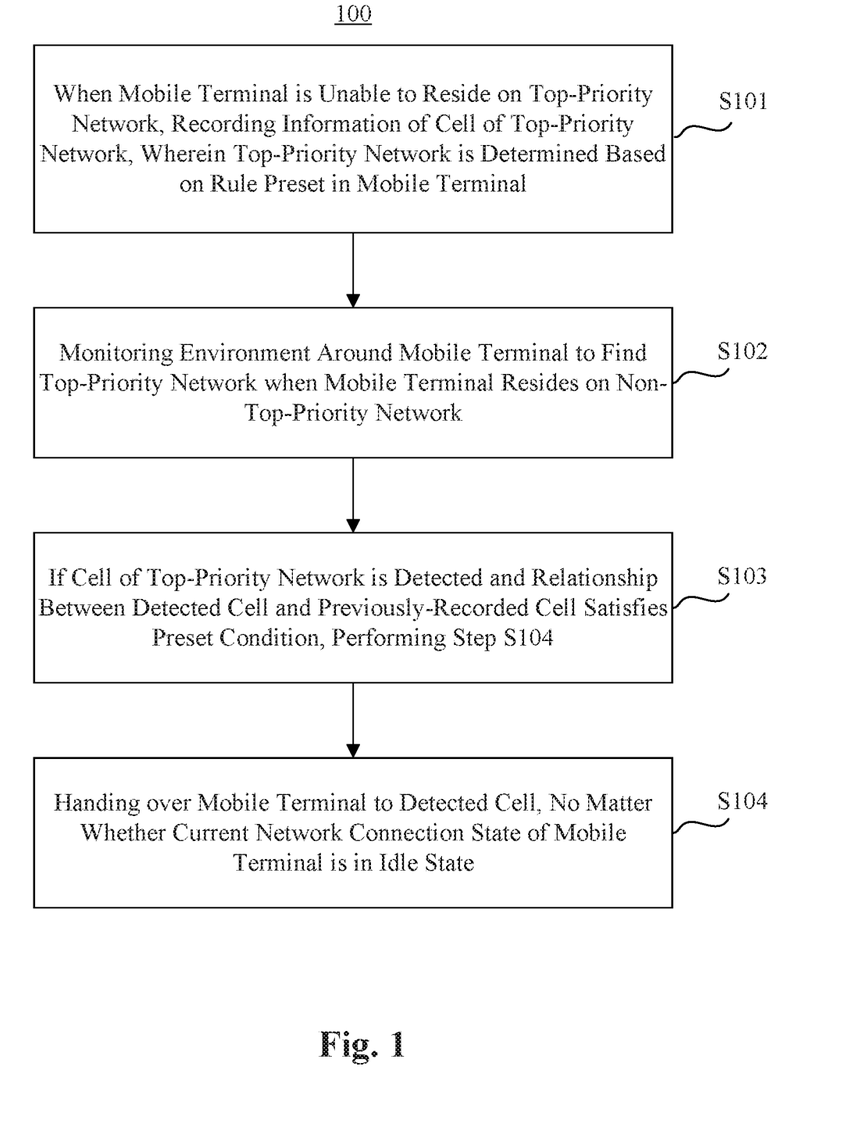
FIG. 1 is a flow chart showing a method for selecting a network according to an exemplary embodiment.

FIG. 1 is a flow chart showing a method 100 for selecting a network according to an exemplary embodiment. The method 100 may be performed by a mobile terminal, such as a cell phone or the like. As shown in FIG. 1, the method 100 may include following steps.

In step S101, when a mobile terminal is unable to reside on a top-priority network, a cell of the top-priority network that the mobile terminal is currently unable to reside on is recorded, wherein the top-priority network is determined based on a rule preset in the mobile terminal.

In the present embodiment, when the mobile terminal judges priority of a searched network, it eliminates the dependency on the network to provide instructions. That is, the mobile terminal may determine whether a network is the top-priority network based on its preset rule, without relying on the network to provide an identifier on priority.

The content of the preset rule is not limited by the embodiments of the present disclosure. For example, it may be provided that priority of 2G, 3G and 4G is gradually higher and 4G is the top-priority network. any rules may be used herein as long as they do not depart from the spirit and protection scope of the present disclosure.

As an example, the preset rule may include defining an LTE network on which the mobile terminal resides as the top-priority network.

In the present embodiment, the mobile terminal resides on a cell of the top-priority network. However, due to certain reasons, such as CSFB (Circuit Switched Fallback), weak signal coverage, congestion, network problems or the like, the mobile terminal is unable to reside on the top-priority network. In the present embodiment, the mobile terminal may record information of the cell before leaving the cell, after leaving the cell or while leaving the cell. For example, the mobile terminal may record information of the cell, such as the identification of the cell, the reason for leaving or the like. The recorded content is not limited in the embodiment of the present disclosure.

In step S102, an environment around the mobile terminal is monitored for find a top-priority network when the mobile terminal is residing on a non-top-priority network.

After the mobile terminal has to leave the top-priority network and resides on a non-top-priority network, the environment around the mobile terminal may be monitored to find a top-priority network, so that the mobile terminal may timely return to the top-priority network when conditions mature.

In step S103, a cell of the top-priority network is detected. If a relationship between the detected cell and the previously-recorded cell satisfies a preset condition, step S104 is performed.

On the other hand, if a cell of the top-priority network is not detected, or if a cell of the top-priority network is detected but a relationship between the monitored cell and the previously-recorded cell does not satisfy a preset condition, step S104 is not performed. The mobile terminal may, for example, continue to reside on the current non-top-priority network.

In step S104, no matter whether a current network connection state of the mobile terminal is an idle state, the mobile terminal is handed over to the detected cell.

As an example, consistent with embodiments of the present disclosure, the preset condition may include one of the following conditions.

i) The detected cell is not the previously-recorded cell.

Figure 2:
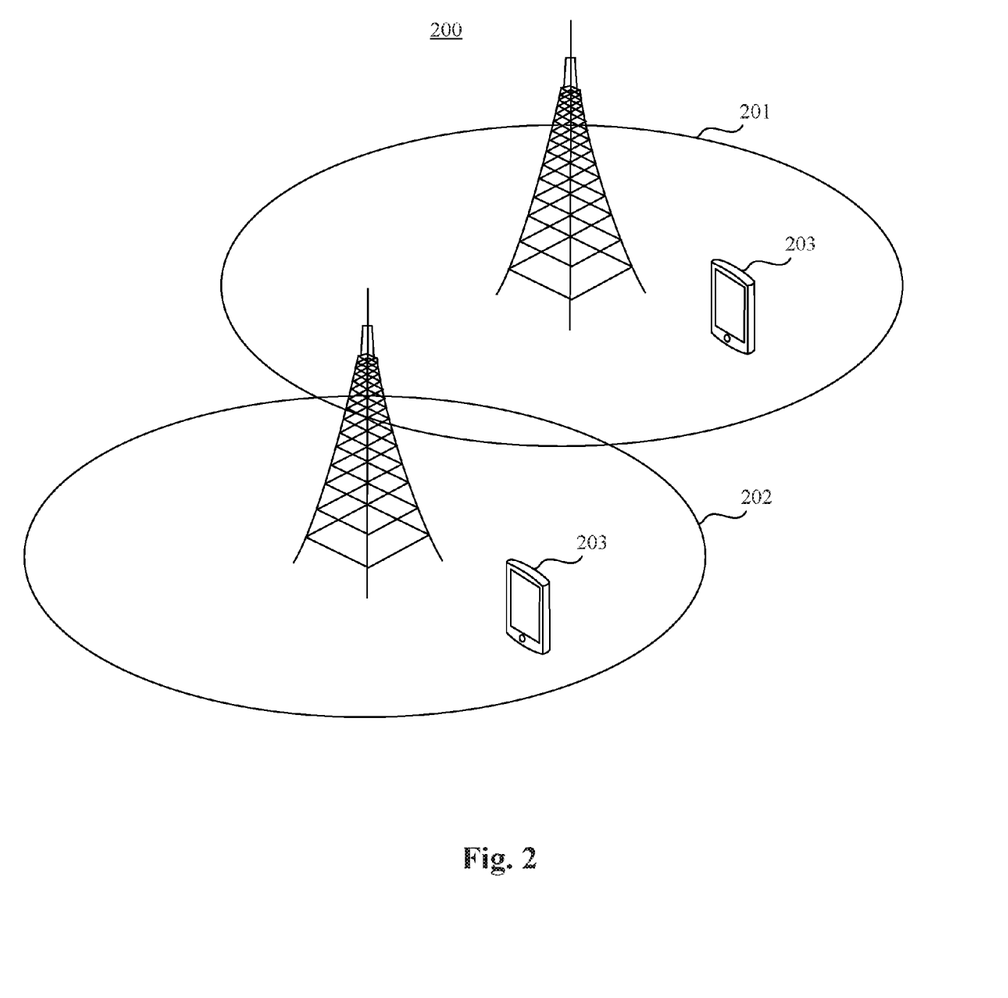
FIG. 2 shows a wireless network system according to an exemplary embodiment.

In the present embodiment, the previously-recorded cell is referred to as an old cell, and the detected cell is referred to as a new cell. FIG. 2 shows a wireless network system 200 including a mobile terminal 203, an old cell 201, and a new cell 202, according to an exemplary embodiment. The two cells are different. The mobile terminal 203 was previously in the old cell 201, and then moves to the new cell 202.

Since the old cell 201 has problems such as congestion or the like, the old cell 201 should be avoided and the mobile terminal 203 has to leave the old cell 201. However, if a newly found new cell 202 is no longer the old cell 201, it is reasonable to hand over the mobile terminal 203 to the new cell 202, so that the mobile terminal 203 may return to a top-priority network as quickly as possible. In addition, it should be understood that it is possible that problems such as congestion or the like also exist in the new cell. Such case will not be discussed in the present disclosure.

In some embodiments, the preset condition may also include the following condition.

ii) The detected cell is the previously-recorded cell, and an interval between a current time and a time when the mobile terminal left the previously-recorded cell exceeds a preset time period.

The preset time period may also be referred to as an avoiding time period. If the detected cell is the old cell, but an interval between a current time and a time when the mobile terminal left the old cell is long enough, i.e. exceeding a preset time period, it is likely that problems such as congestion or the like in the old cell have been solved so that the old cell is no longer to be avoided. Therefore, it is also reasonable to hand over the mobile terminal back to the old cell, so that the mobile terminal may return to the top-priority network as quickly as possible.

A length of the preset time period is not limited in the present embodiment. Those skilled in the art may preset the time period as, for example, 5 minutes, 10 minutes or the like according to different scenarios. In addition, it should be understood that it is possible that problems such as congestion or the like still exist in the old cell after the preset time period. Such case will not be discussed in the present disclosure.

In addition, in some embodiments, at least two cells of the top-priority network are detected at the same time, which may include both a new cell and an old cell satisfying preset time period requirement. The detected cells may be ranked based on factors such as signal strength, communication quality or the like, and one of the cells may be selected as a cell to be resided on.

Figure 3:
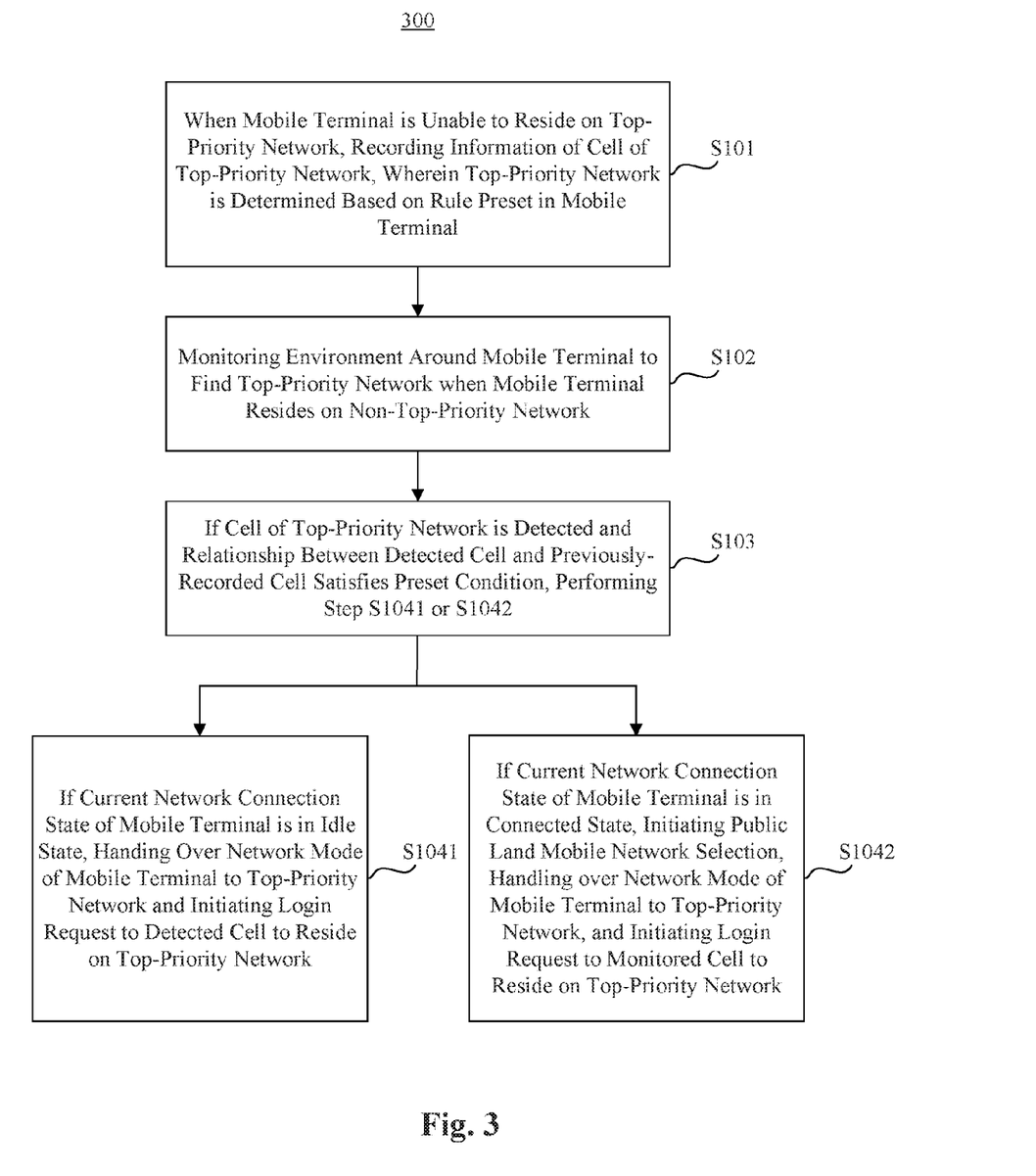
FIG. 3 is a flow chart showing another method for selecting a network according to an exemplary embodiment.

FIG. 3 is a flow chart showing a method 300 for selecting a network according to an exemplary embodiment. The method 300 may be performed by a mobile terminal. The method 300 is similar to the method 100 in that step S104 is replaced by steps S1041 and S1042.

In step S1041, if the current network connection state of the mobile terminal is an idle state, a network mode of the mobile terminal is switched to the top-priority network, and a login request to the detected cell is initiated to reside on the top-priority network.

In step S1042, if the current network connection state of the mobile terminal is a connected state, a PLMN (Public Land Mobile Network) selection is initiated so that a network mode of the mobile terminal is switched to the top-priority network and a login request to the detected cell is initiated to reside on the top-priority network.

Initiating a PLMN selection is a command to its own underlying module performed by the mobile terminal. If the mobile terminal is currently connected to a network, initiating a PLMN selection will compulsorily disconnect the mobile terminal from the network and allow the mobile terminal to reselect a network. In the related art, the mobile terminal is currently connected to a network, even a lower priority network, it will not be compulsorily disconnected from the current network.

In the embodiments of the present disclosure, when a mobile terminal is unable to reside on a top-priority network due to certain reasons, the mobile terminal may record information of a cell of the top-priority network that the mobile terminal is currently unable to reside on, wherein the top-priority network is determined based on a rule preset in the mobile terminal. If the mobile terminal detects a cell of a top-priority network and a relationship between the detected cell and the previously-recorded cell satisfies a preset condition, the mobile terminal is handed over to the detected cell, no matter whether a current network connection state of the mobile terminal is an idle state. In the present embodiment, the mobile terminal may learn about whether the current network is the top-priority network without relying on identifiers provided by the network, and eliminate the dependency on the network, so that the mobile terminal may quickly return to a network with substantially higher priority even when the network side does not provide identifiers on priority. Further, the mobile terminal may determine whether the top-priority network it left may be returned to, by recording information of the cell of the top-priority network it leaves and determining whether a detected new cell is of the top-priority network. The mobile terminal may be forced to return to the top-priority network after the above determination. Therefore, the mobile terminal may quickly return to a network with substantially higher priority even when the network does not provide identifiers on priority.

Figure 4:
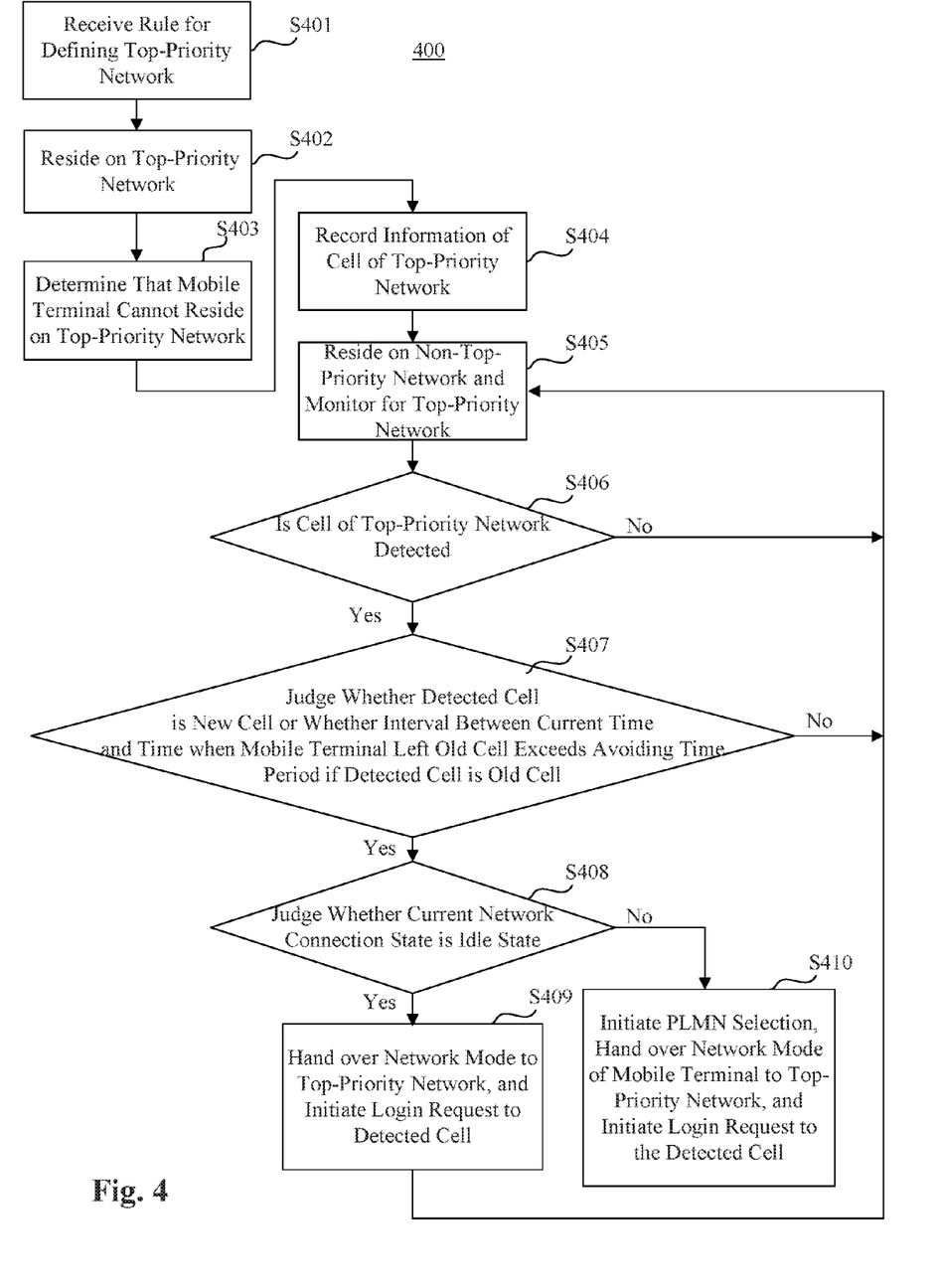
FIG. 4 is a flow chart showing another method for selecting a network according to an exemplary embodiment.

FIG. 4 is a flow chart showing a method 400 for selecting a network according to an exemplary embodiment. The method 400 may be performed by a mobile terminal, such as a cell phone or the like. As shown in FIG. 4, the method 400 may include following steps.

In step S401, a mobile terminal receives a rule for defining a top-priority network.

For example, the mobile terminal may receive a rule when leaving a factory, as a default rule in the mobile terminal. The user may also define the rule in the mobile terminal through operation during the use of the terminal.

In step S402, the mobile terminal resides on a top-priority network.

In step S403, at one time, the mobile terminal finds that it cannot reside on the top-priority network, due to reasons such as CSFB, weak signal coverage, congestion, network problems or the like.

In step S404, the mobile terminal records information of a cell of the top-priority network when it leaves the network.

In step S405, the mobile terminal resides on a non-top-priority network, and monitors its environment for a top-priority network.

In step S406, the mobile terminal judges whether a cell of a top-priority network is detected. If it is detected, the method 400 proceeds to step S407. If no top-priority network is detected, the method returns to step S405.

In step S407, the mobile terminal judges whether the detected cell is a new cell, or whether an interval between a current time and a time when the mobile terminal left the previously-recorded old cell exceeds an avoiding time period if the detected cell is the previously-recorded old cell.

If the detected cell is a new cell, or an interval between a current time and a time when the mobile terminal left the previously-recorded old cell exceeds an avoiding time period if the detected cell is the previously-recorded old cell, the method 400 proceeds to step S408. Otherwise, it returns to step S405.

In step S408, the mobile terminal judges whether its network connection state is an idle state. If it is in an idle state, the method 400 proceeds to step S409. Otherwise, it proceeds to step S410.

In step S409, the mobile terminal switches its network mode to the top-priority network, and initiates a login request to the detected cell to reside on the top-priority network. The method 400 then returns to step S402.

In step S410, the mobile terminal initiates a PLMN selection, switches a network mode of the mobile terminal to the top-priority network, and initiates a login request to the detected cell to reside on the top-priority network. The method 400 then returns to step S402.

In the embodiments of the present disclosure, when a mobile terminal is unable to reside on a top-priority network due to certain reasons, the mobile terminal may record information of a cell of the top-priority network that the mobile terminal is currently unable to reside on, wherein the top-priority network is determined based on a rule preset in the mobile terminal. If the mobile terminal detects a cell of a top-priority network and a relationship between the detected cell and the previously-recorded cell satisfies a preset condition, the mobile terminal is handed over to the detected cell, no matter whether a current network connection state of the mobile terminal is an idle state. In the present embodiment, the mobile terminal may learn about whether the current network is the top-priority network without relying on identifiers provided by the network, and eliminate the dependency on the network, so that the mobile terminal may quickly return to a network with substantially higher priority even when the network side does not provide identifiers on priority. Further, the mobile terminal may determine whether the top-priority network it left may be returned to, by recording information of the cell of the top-priority network it leaves and determining whether a detected new cell is of the top-priority network. The mobile terminal may be forced to return to the top-priority network after the above determination. Therefore, the mobile terminal may quickly return to a network with substantially higher priority even when the network does not provide identifiers on priority.

The present disclosure further provides embodiments of apparatuses, which may be configured to perform the embodiments of methods of the present disclosure. Details not disclosed in the embodiments of apparatuses may be referred to the embodiments of methods.

Figure 5:
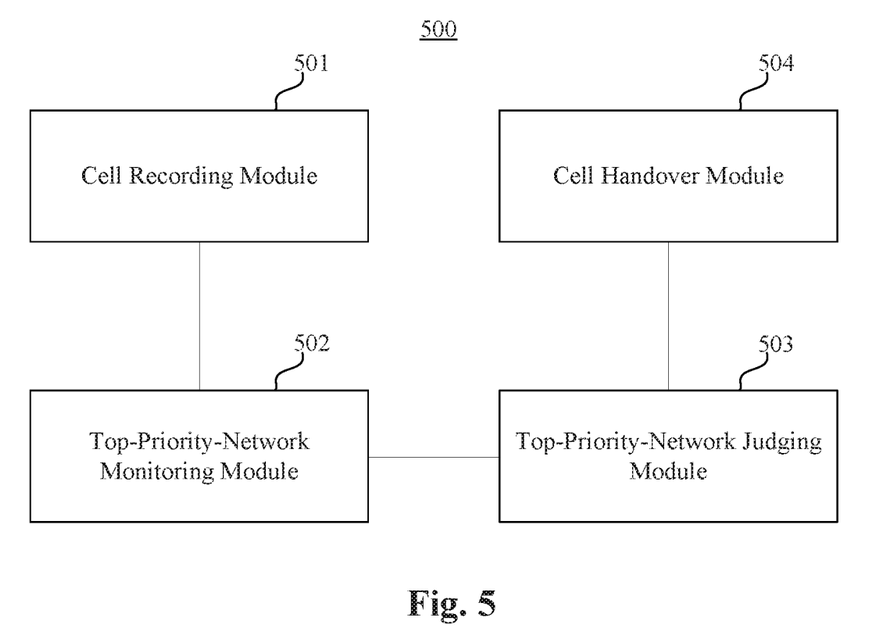
FIG. 5 is a block diagram of an apparatus for selecting a network according to an exemplary embodiment.

FIG. 5 is a block diagram showing an apparatus 500 for selecting a network according to an exemplary embodiment. The apparatus 500 may be a mobile terminal configured to perform the above methods. The apparatus 500 may include: a cell recording module 501, a top-priority-network monitoring module 502, a top-priority-network judging module 503, and a cell handover module 504.

The cell recording module 501 is configured to, when a mobile terminal is unable to reside on a top-priority network, record information of a cell of the top-priority network that the mobile terminal is currently unable to reside on, wherein the top-priority network is determined based on a rule preset in the mobile terminal.

The top-priority-network monitoring module 502 is configured to monitor an environment to find a top-priority network when the mobile terminal is residing on a non-top-priority network.

The top-priority-network judging module 503 is configured to, if the top-priority-network monitoring module 502 finds/detects a cell of a top-priority network and a relationship between the detected cell and the previously-recorded cell satisfies a preset condition, activate the cell handover module 504.

The cell handover module 504 is configured to hand over the mobile terminal to the detected cell, no matter whether a network connection state of the mobile terminal is an idle state.

In some embodiments, the preset condition may include that the detected cell is not the previously-recorded cell.

In some embodiments, the preset condition may include that the detected cell is the previously-recorded cell and that an interval between a current time and a time when the mobile terminal left the previously-recorded cell exceeds a preset time period.

Figure 6:
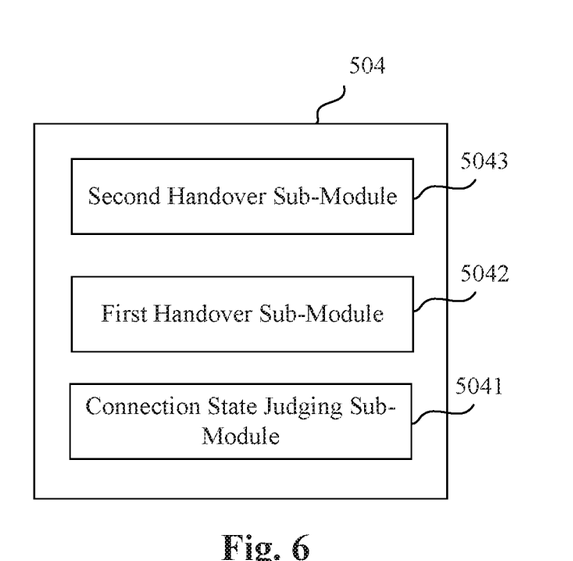
FIG. 6 is a block diagram of a cell handover module according to an exemplary embodiment.

FIG. 6 is a block diagram of the cell handover module 504, according to an exemplary embodiment. As shown in FIG. 6, the cell handover module 504 may include a connection state judging sub-module 5041, a first handover sub-module 5042, and a second handover sub-module 5043.

The connection state judging sub-module 5041 is configured to judge whether the network connection state of the mobile terminal is in an idle state, activate the first handover sub-module 5042 if it is in an idle state, and activate the second handover sub-module 5043 if it is in a connected state.

The first handover sub-module 5042 is configured to, switch a network mode of the mobile terminal to the top-priority network and initiate a login request to the detected cell to reside on the top-priority network.

The second handover sub-module 5043 is configured to, initiate a Public Land Mobile Network (PLMN) selection, switch a network mode of the mobile terminal to the top-priority network, and initiate a login request to the detected cell to reside on the top-priority network.

In some embodiments, the preset rule may include defining an LTE network on which the mobile terminal resides as the top-priority network.

In the embodiments of the present disclosure, when a mobile terminal is unable to reside on a top-priority network due to certain reasons, the mobile terminal may record information of a cell of the top-priority network that the mobile terminal is currently unable to reside on, wherein the top-priority network is determined based on a rule preset in the mobile terminal. If the mobile terminal detects a cell of a top-priority network and a relationship between the detected cell and the previously-recorded cell satisfies a preset condition, the mobile terminal is handed over to the detected cell, no matter whether a current network connection state of the mobile terminal is an idle state. In the present embodiment, the mobile terminal may learn about whether the current network is the top-priority network without relying on identifiers provided by the network, and eliminate the dependency on the network, so that the mobile terminal may quickly return to a network with substantially higher priority even when the network side does not provide identifiers on priority. Further, the mobile terminal may determine whether the top-priority network it left may be returned to, by recording information of the cell of the top-priority network it leaves and determining whether a detected new cell is of the top-priority network. The mobile terminal may be forced to return to the top-priority network after the above determination. Therefore, the mobile terminal may quickly return to a network with substantially higher priority even when the network does not provide identifiers on priority.

With respect to the apparatuses in the above embodiments, the specific manners the individual modules are operated have been described in detail in the embodiments regarding the methods, which will not be elaborated herein.

The present disclosure also provides an apparatus for selecting a network. The apparatus includes a processor and a memory for storing instructions executable by the processor. The processor is configured to perform:

when a mobile terminal is unable to reside on a top-priority network, recording information of a cell of the top-priority network that the mobile terminal is unable to reside on, wherein the top-priority network is determined based on a rule preset in the mobile terminal;

monitoring an environment to detect a top-priority network when the mobile terminal is residing on a non-top-priority network; and if a cell of the top-priority network is detected and a relationship between the detected cell and the previously-recorded cell satisfies a preset condition, handing over the mobile terminal to the detected cell, no matter whether a network connection state of the mobile terminal is an idle state.

The present disclosure also provides a non-transitory computer readable storage medium storing instructions which, when executed by a processor of a mobile terminal, cause the mobile terminal to perform the method for selecting a network, including:

when a mobile terminal is unable to reside on a top-priority network, recording information of a cell of the top-priority network that the mobile terminal is unable to reside on, wherein the top-priority network is determined based on a rule preset in the mobile terminal;

monitoring an environment to detect a top-priority network when the mobile terminal is residing on a non-top-priority network; and if a cell of the top-priority network is detected and a relationship between the detected cell and the previously-recorded cell satisfies a preset condition, handing over the mobile terminal to the detected cell, no matter whether a network connection state of the mobile terminal is an idle state.

Figure 7:
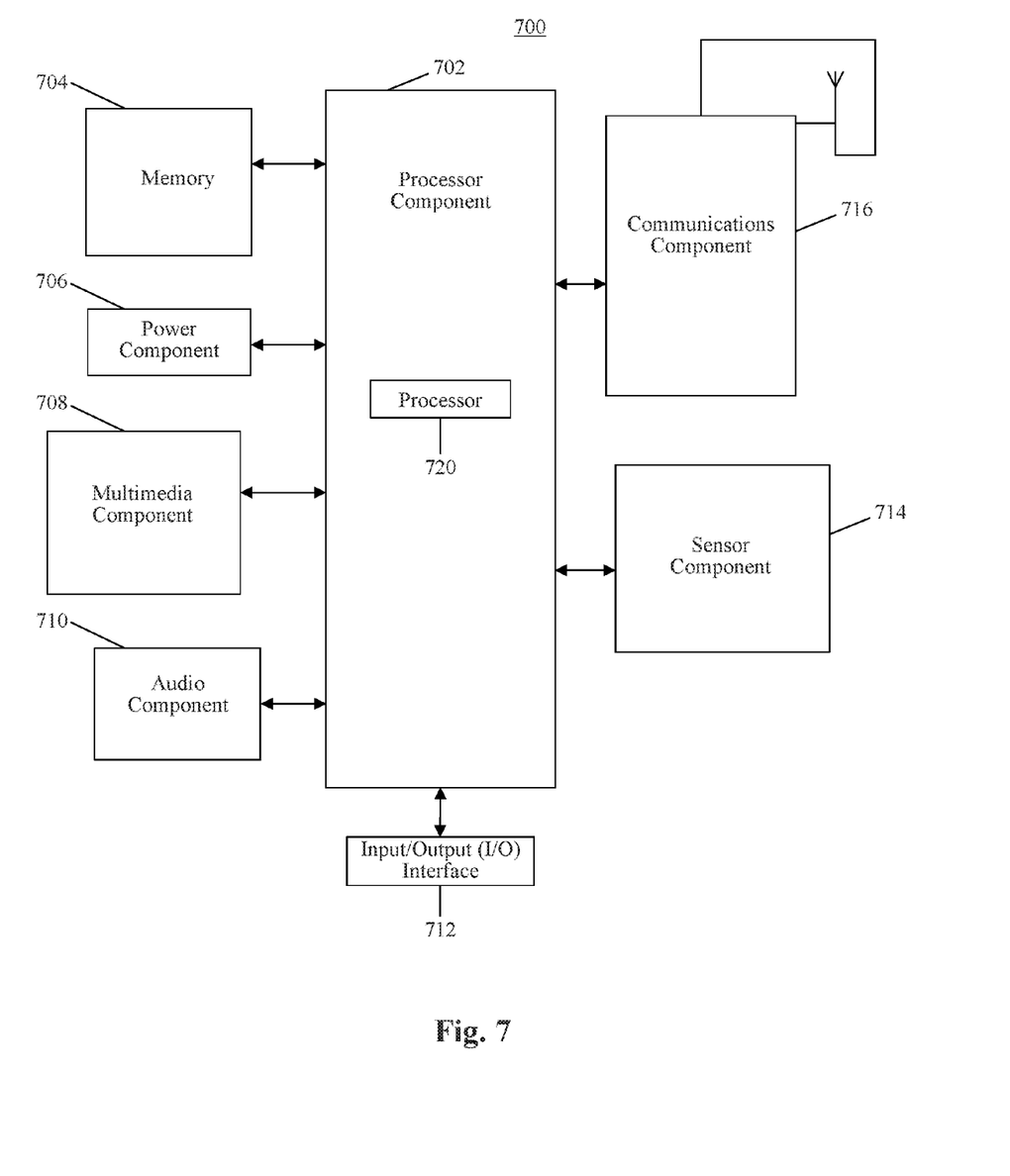
FIG. 7 is a block diagram showing another apparatus for selecting a network according to an exemplary embodiment.

FIG. 7 is a block diagram of an apparatus 700 for selecting a network according to an exemplary embodiment. The apparatus 700 may be a mobile terminal described above, such as a mobile phone, a computer, a digital broadcast terminal, a messaging device, a gaming console, a tablet, a medical device, exercise equipment, a personal digital assistant, and the like.

Referring to FIG. 7, the apparatus 700 may include one or more of the following components: a processing component 702, a memory 704, a power component 706, a multimedia component 708, an audio component 710, an input/output (I/O) interface 712, a sensor component 714, and a communication component 716.

The processing component 702 typically controls overall operations of the apparatus 700, such as the operations associated with display, telephone calls, data communications, camera operations, and recording operations. The processing component 702 may include one or more processors 720 to execute instructions to perform all or part of the steps in the above described methods. Moreover, the processing component 702 may include one or more modules which facilitate the interaction between the processing component 702 and other components. For instance, the processing component 702 may include a multimedia module to facilitate the interaction between the multimedia component 708 and the processing component 702.

The memory 704 is configured to store various types of data to support the operation of the apparatus 700. Examples of such data include instructions for any applications or methods operated on the apparatus 700, contact data, phonebook data, messages, pictures, video, etc. The memory 704 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 706 provides power to various components of the apparatus 700. The power component 706 may include a power management system, one or more power sources, and any other components associated with the generation, management, and distribution of power in the apparatus 700.

The multimedia component 708 includes a screen providing an output interface between the apparatus 700 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 708 includes a front camera and/or a rear camera. The front camera and the rear camera may receive an external multimedia datum while the apparatus 700 is in an operation mode, such as a photographing mode or a video mode. Each of the front camera and the rear camera may be a fixed optical lens system or have focus and optical zoom capability.

The audio component 710 is configured to output and/or input audio signals. For example, the audio component 710 includes a microphone ("MIC") configured to receive an external audio signal when the apparatus 700 is in an operation mode, such as a call mode, a recording mode, and a voice recognition mode. The received audio signal may be further stored in the memory 704 or transmitted via the communication component 716. In some embodiments, the audio component 710 further includes a speaker to output audio signals.

The I/O interface 712 provides an interface between the processing component 702 and peripheral interface modules, such as a keyboard, a click wheel, buttons, and the like. The buttons may include, but are not limited to, a home button, a volume button, a starting button, and a locking button.

The sensor component 714 includes one or more sensors to provide status assessments of various aspects of the apparatus 700. For instance, the sensor component 714 may monitor an open/closed status of the apparatus 700, relative positioning of components, e.g., the display and the keypad, of the apparatus 700, a change in position of the apparatus 700 or a component of the apparatus 700, a presence or absence of user contact with the apparatus 700, an orientation or an acceleration/deceleration of the apparatus 700, and a change in temperature of the apparatus 700. The sensor component 714 may include a proximity sensor configured to monitor the presence of nearby objects without any physical contact. The sensor component 714 may also include a light sensor, such as a CMOS or CCD image sensor, for use in imaging applications. In some embodiments, the sensor component 714 may also include an accelerometer sensor, a gyroscope sensor, a magnetic sensor, a pressure sensor, or a temperature sensor.

The communication component 716 is configured to facilitate communication, wired or wirelessly, between the apparatus 700 and other devices. The apparatus 700 can access a wireless network based on a communication standard, such as WiFi, 2G, 3G, 4G, or a combination thereof. In one exemplary embodiment, the communication component 716 receives a broadcast signal or broadcast associated information from an external broadcast management system via a broadcast channel. In one exemplary embodiment, the communication component 716 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 700 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods at a terminal side.

Other embodiments of the present disclosure will be apparent to those skilled in the art from consideration of the specification and practice of the present disclosure disclosed here. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A method for a mobile terminal to select a network, comprising:
   when the mobile terminal is unable to reside on a top-priority network, recording information of a first cell of the top-priority network that the mobile terminal is unable to reside on, wherein the top-priority network is determined based a rule preset in the mobile terminal;
   monitoring an environment for detecting the top-priority network when the mobile terminal is residing on a non-top-priority network; and
   if a second cell of the top-priority network is detected and a relationship between the detected second cell and the first cell satisfies a preset condition, handing over the mobile terminal to the detected second cell, no matter whether a current network connection state of the mobile terminal is an idle state, wherein the handing over the mobile terminal to the detected second cell comprises:
if the current network connection state of the mobile terminal is the idle state, switching a network mode of the mobile terminal to the top-priority network, and initiating a login request to the detected second cell to reside on the top-priority network; and
if the current network connection state of the mobile terminal is a connected state, initiating a Public Land Mobile Network (PLMN) selection, switching a network mode of the mobile terminal to the top-priority network, and initiating a login request to the detected second cell to reside on the top-priority network.

2. The method of claim 1, wherein the preset condition comprises:
the detected second cell not being the first cell of which the information is recorded.

3. The method of claim 1, wherein the present condition comprises:
the detected second cell being the first cell of which the information is recorded, and an interval between a current time and a time when the mobile terminal left the first cell exceeds a preset time period.

4. The method of claim 1, wherein the preset rule comprises:
defining a Long Term Evolution (LTE) network on which the mobile terminal resides as the top-priority network.

5. A mobile terminal for selecting a network, comprising:
a processor; and
a memory for storing instructions executable by the processor,
wherein the processor is configured to perform:
when the mobile terminal is unable to reside on a top-priority network, recording information of a first cell of the top-priority network, wherein the top-priority network is determined based on a rule preset in the mobile terminal;
monitoring an environment for detecting the top-priority network when the mobile terminal is residing on a non-top-priority network; and
if a second cell of the top-priority network is detected and a relationship between the detected second cell and the first cell satisfies a preset condition, handing over the mobile terminal to the detected second cell, no matter whether a network connection state of the mobile terminal is an idle state,
wherein the handing over the mobile terminal to the detected second cell comprises:
if the current network connection state of the mobile terminal is the idle state, switching a network mode of the mobile terminal to the top-priority network, and initiating a login request to the detected second cell to reside on the top-priority network; and
if the current network connection state of the mobile terminal is a connected state, initiating a Public Land Mobile Network (PLMN) selection, switching a network mode of the mobile terminal to the top-priority network, and initiating a login request to the detected second cell to reside on the top-priority network.

6. The mobile terminal of claim 5, wherein the preset condition comprises:
the detected second cell not being the first cell of which the information is recorded.

7. The mobile terminal of claim 5, wherein the preset condition comprises:
the detected second cell being the first cell of which the information is recorded, and an interval between a current time and a time when the mobile terminal left the first cell exceeds a preset time period.

8. The mobile terminal of claim 5, wherein the preset rule comprises:
defining a Long Term Evolution (LTE) network on which the mobile terminal resides as the top-priority network.

9. A non-transitory computer readable storage medium storing instructions that, when executed by a processor in a mobile terminal, cause the mobile terminal to perform a method for selecting a network, the method comprising:
when the mobile terminal is unable to reside on a top-priority network, recording information of a first cell of the top-priority network, wherein the top-priority network is determined based on a rule preset in the mobile terminal;
monitoring an environment for detecting the top-priority network when the mobile terminal is residing on a non-top-priority network; and
if a second cell of the top-priority network is detected and a relationship between the detected second cell and the first cell satisfies a preset condition, handing over the mobile terminal to the detected second cell, no matter whether a network connection state of the mobile terminal is an idle state,
wherein the handing over the mobile terminal to the detected second cell comprises:
if the current network connection state of the mobile terminal is the idle state, switching a network mode of the mobile terminal to the top-priority network, and initiating a login request to the detected second cell to reside on the top-priority network; and
if the current network connection state of the mobile terminal is a connected state, initiating a Public Land Mobile Network (PLMN) selection, switching a network mode of the mobile terminal to the top-priority network, and initiating a login request to the detected second cell to reside on the top-priority network.

* * * * *